United States Patent [19]

Rooks

[11] 3,776,097
[45] Dec. 4, 1973

[54] BEVELING MACHINE AND METHOD

[75] Inventor: Gerald T. Rooks, San Francisco, Calif.

[73] Assignee: Circuit Equipment Corporation, San Bruno, Calif.

[22] Filed: Jan. 21, 1972

[21] Appl. No.: 219,636

[52] U.S. Cl.............. 90/16, 83/477.1, 83/912, 144/126, 51/92 R
[51] Int. Cl. .............................. B27c 5/04
[58] Field of Search ..................... 90/16, DIG. 5; 29/21; 144/125, 126, 127, 118, 134, 133 R; 83/912, 437, 527, 508.2, 508.3, 477.1; 51/92 R, 92 HK

[56] References Cited
UNITED STATES PATENTS

| 77,606 | 5/1868 | Grosvenor | 83/477.1 |
| 3,315,715 | 4/1967 | Mytinger | 83/477.1 |
| 1,940,310 | 12/1933 | Lamb | 83/437 |
| 2,756,787 | 7/1956 | Siese | 144/133 R |
| 3,386,482 | 6/1968 | Nadeau | 83/477.1 |
| 1,689,703 | 10/1928 | Vidaver | 83/912 |
| 2,802,318 | 8/1957 | Sturdy | 51/92 R X |
| 3,427,752 | 2/1969 | Barron | 51/92 R |

Primary Examiner—Andrew R. Juhasz
Assistant Examiner—Z. R. Bilinsky
Attorney—Paul D. Flehr et al.

[57] ABSTRACT

Beveling machine and method in which a workpiece is passed over a small portion of the cutting edge of a circular cutting blade. Guides are provided for positioning the workpiece, and means is provided for adjusting the relative positions of the guides and blade to adjust the depth and angle of cut.

6 Claims, 5 Drawing Figures

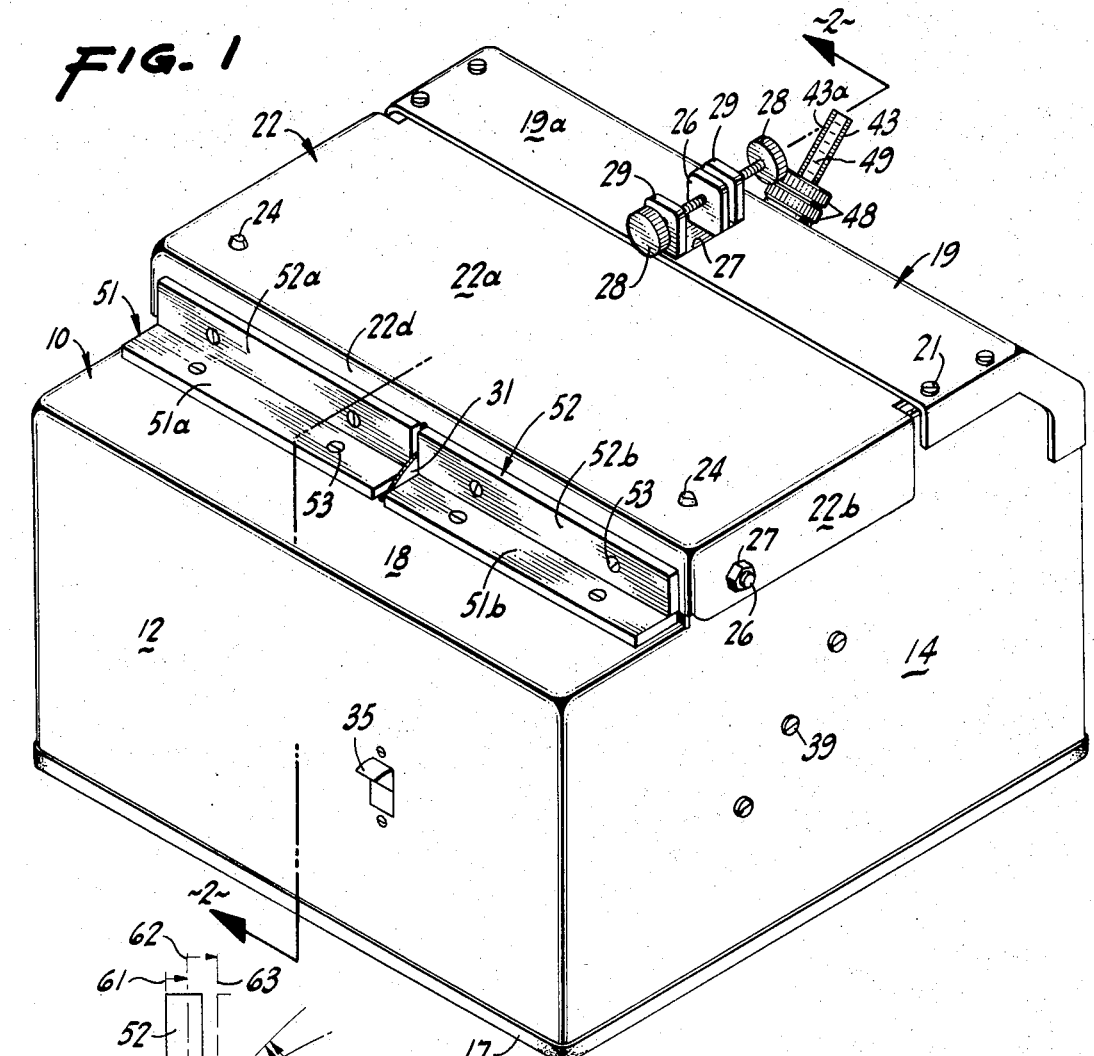
FIG. 1
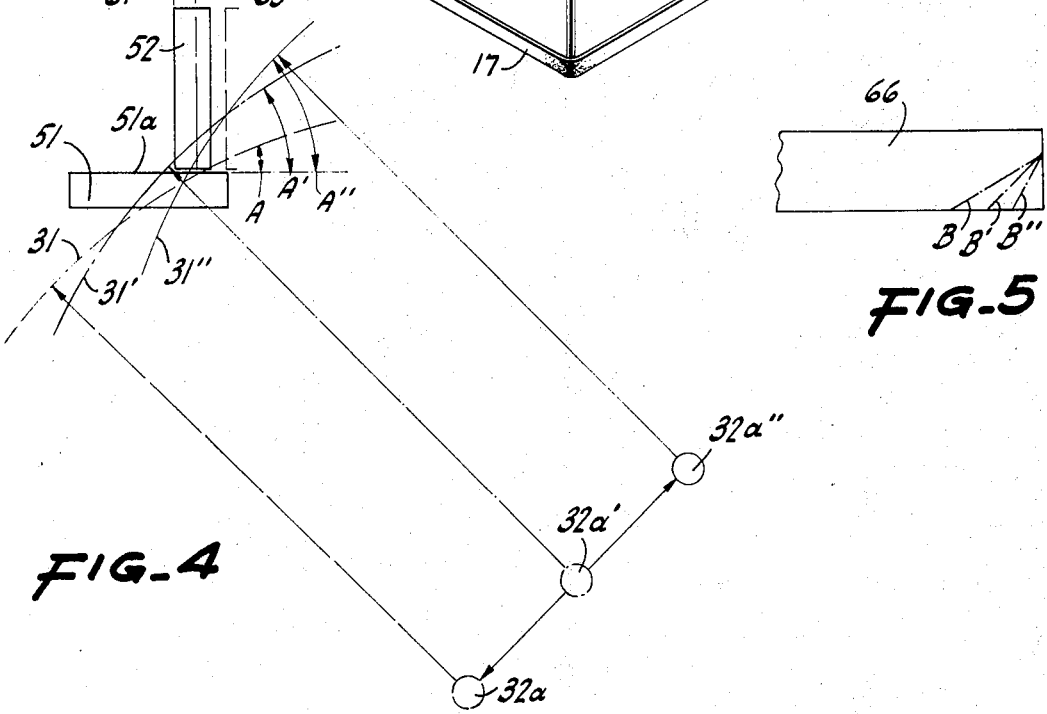
FIG. 4
FIG. 5

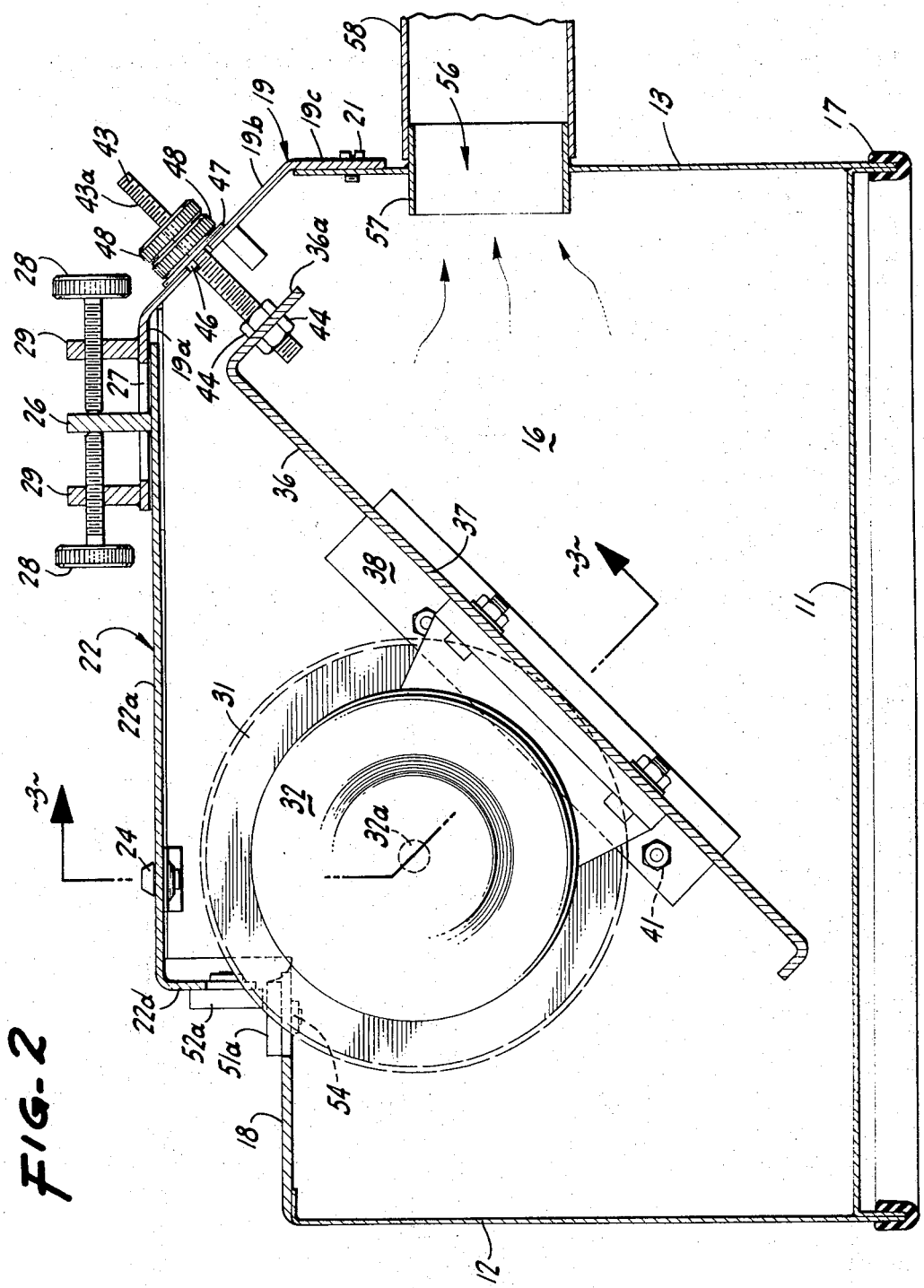

BEVELING MACHINE AND METHOD

BACKGROUND OF THE INVENTION

This invention pertains generally to machine tools and more particularly to a beveling machine and method which are particularly suitable for use on printed circuit boards.

In the manufacture of plug-in type printed circuit boards, a plurality of copper fingers or contacts are commonly provided at the leading edge of the board for engaging mating contacts in sockets which receive the boards. The fingers are formed as a part of the lead pattern on one or both surfaces of the board. The leading edge of such a board is generally beveled to facilitate its insertion into the socket.

Heretofore, the beveled edges of printed circuit boards have commonly been found by means of a high speed cutting tool such as a router bit or end mill having a diameter on the order of one-fourth inch. This type of cutter tends to tear the copper lamination and separate it from the substrate.

SUMMARY AND OBJECTS OF THE INVENTION

In the beveling machine and method of the present invention, beveled cuts are made by passing a workpiece over a small portion of the cutting edge of a relatively large circular cutting blade, such as a circular saw blade. Guides are provided for positioning the workpiece, and means is included for adjusting the relative positions of the guides and cutting blade to provide a desired depth and angle of cut. All rotating parts, namely the motor and cutting blade, are enclosed in a metal cabinet to assure maximum safety to an operator of the machine.

It is, in general, an object of the present invention to provide a new and improved beveling machine and method.

Another object of the invention is to provide a beveling machine and method of the above character which are particularly suitable for use with printed circuit boards.

Another object of the invention is to provide a beveling machine and method of the above character utilizing a relatively large circular cutting blade.

Additional objects and features of the invention will be apparent from the following description in which the presently preferred embodiment is set forth in detail in conjunction with the accompanying drawings.

BRIEF DESCRIPTION OF THE DRAWINGS

FIG. 1 is an isometric view of the embodiment of a beveling machine incorporating the present invention.

FIG. 2 is a sectional view taken along line 2—2 in FIG. 1.

FIG. 4 illustrates the manner in which the workpiece guides and cutting blade can be adjusted to set the depth and angle of cut.

FIG. 5 illustrates the cuts provided by the illustrative settings of the blade shown in FIG. 4.

DESCRIPTION OF THE PREFERRED EMBODIMENT

Figure 3:
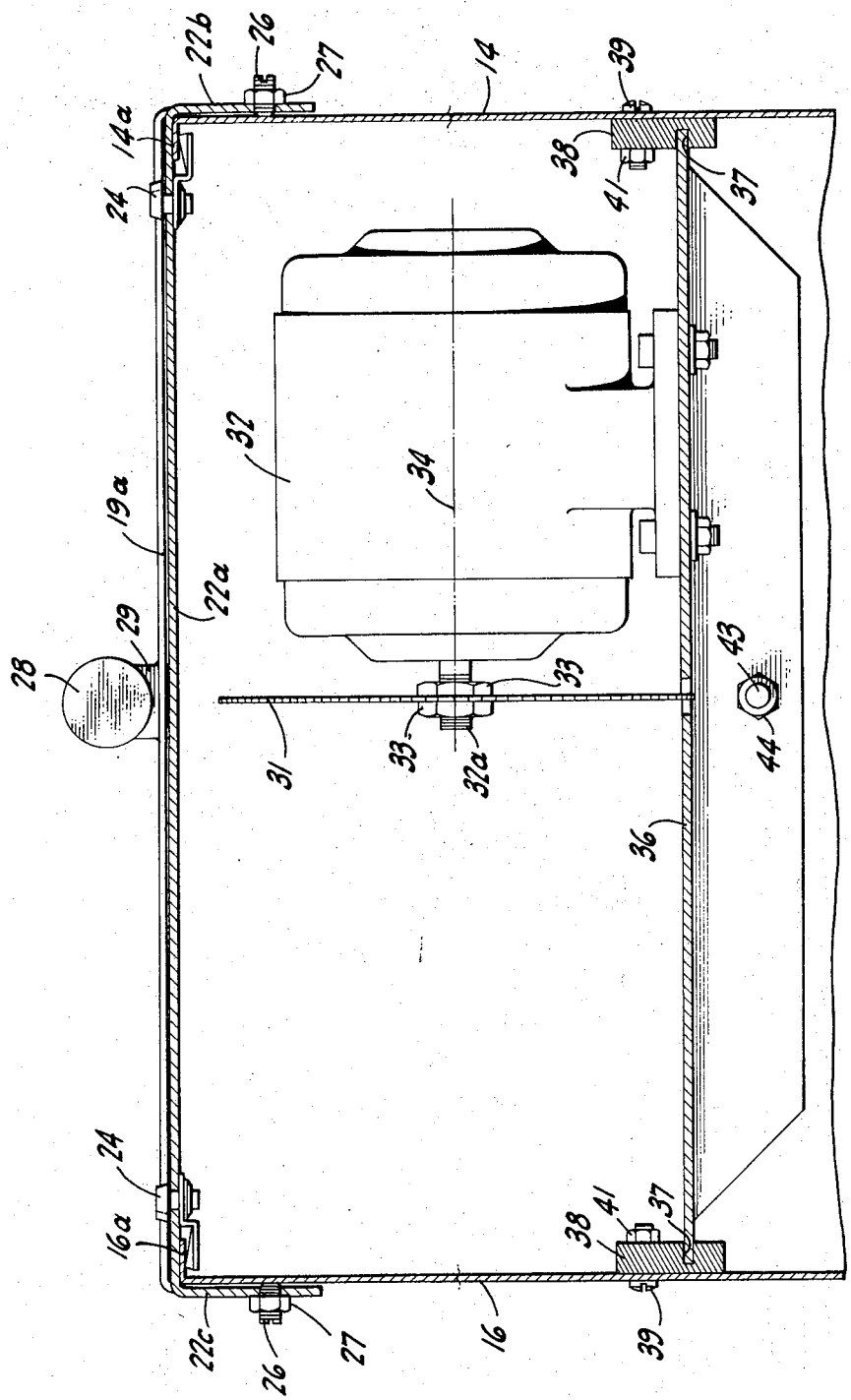
FIG. 3 is a sectional view taken along line 3—3 in FIG.2.

As illustrated in FIGS. 1–3, the beveling machine includes a cabinet 10 having a horizontally extending bottom wall 11, a front wall 12, a back wall 13, and side walls 14 and 16. These walls are fabricated of a rigid material such as steel, and they are rigidly joined together by suitable means such as welding. The bottom wall 11 is recessed above the lower edges of the remaining walls, and a U-shaped band of resilient material, such as rubber of vinyl plastic, extends around the bottom edges of these walls. This band provides cushioning and prevents slippage between the machine and a surface upon which it rests.

A horizontal member 18 extends between the side walls and front wall to form a ledge which is offset below the top edges of the side walls. This member is affixed to the side and front walls by suitable means such as welding.

The upper rear corners of the side walls are beveled, and a fixed top cover 19 is provided at the rear of the cabinet. This cover includes a horizontally extending portion 19a, and inclined portion 19b, and a vertical portion 19c. It is attached to the side and back walls by screws 21.

An adjustable top cover 22 is provided between the ledge-forming member 18 and the fixed top cover 19. The adjustable cover includes a top wall portion 22a, a portion of which extends below the horizontal portion 19a of the fixed top cover. The adjustable cover also includes downwardly depending side skirt portions 22b and 22c, which overlie portions of the side walls 14 and 16, and a front skirt portion 22d which extends downwardly toward the ledge-forming member 18. The top cover 22 rests upon and is supported by inwardly extending lips or flanges 14a and 16a which are provided at the top edges of the side walls. Latch assemblies 24 engage the lower surfaces of the flanges 14a and 16a. The latches can be rotated from the top of the cover to permit removal of the cover from the cabinet. Adjusting screws 26 are mounted in the side skirts 22b and 22c and provided with lock nuts 27. The ends of these screws engage the outer surfaces of the side walls. These screws provide means for making minor adjustments in the position of the cover relative to the side walls, and they also provide means for eliminating free play between the cover and side walls.

Means is provided for adjusting the position of the cover 22 relative to the cover 19. This means includes a block 26 which is rigidly affixed to th cover 22 and extends upwardly through an opening 27 in the cover 19. A pair of knurled thumbscrews 28 are threadedly mounted in blocks 29 which are rigidly affixed to the fixed cover 19. These screws abut against opposite surfaces of the block 26.

A circular cutting blade 31 is mounted inside the cabinet 10. In the presently preferred embodiment, this blade is a carbide tipped circular saw blade having a diameter on the order of 8–10 inches.

The blade is driven by a motor 32 having a threaded shaft 32a upon which the blade is mounted. The blade is locked to the shaft by means of nuts 33, and it rotates about an axis 34. A switch 35 on the front wall of the cabinet controls the operation of the motor. The motor is bolted to a motor plate 36 which is slidably mounted in grooves 37 formed in mounting guide blocks 38. These guide blocks are attached to the side walls of the cabinet by bolts 39 and nuts 41, with the grooves 37 extending in a direction inclined to the horizontal by an angle in the order of 45°.

Means is provided for adjusting the position of the plate 36 longitudinally in the grooves 37. This means includes a threaded member 43 which is affixed to a flange 36a at the upper end of the plate 36 by means of nuts 44. This threaded member extends through an opening 46 in the inclined portion of the fixed cover 19, and a flat washer 47 and knurled thumbnuts 48 are mounted on the member outside the cover. The threaded member is formed to include a flat surface 43a upon which a graduated scale 49 is provided. As is discussed more fully hereinafter, this scale indicates the angle of the cut which the blade is set to make.

Means is provided for receiving workpieces and guiding them relative to the cutting blade 41. This means includes a fixed workpiece guide 51 which is mounted on the ledge-forming member 18 and an adjustable workpiece guide 52 which is mounted on the front skirt 22d of the adjustable cover 22. Each of the guides is formed in two axially spaced apart sections, and the blade 31 extends through the space between the sections. The sections are fabricated of a rigid material, such as hardened steel, and they are formed to include generally planar guide surfaces 51a – 52b. The surfaces 51a and 51b of the fixed guide are horizontally disposed, and the surfaces 52a and 52b of the adjustable guide are vertically disposed. The guide sections are affixed to the member 18 and the skirt 22d by means of recessed screws 53 and nuts 54.

Material removed from workpieces can fall into the cabinet through the space around the blade 31, and means is provided for removing this material from the cabinet. This means includes an exhaust port 56 which is provided with a fitting 57 for receiving a vacuum line 58. The line 58 can lead to a conventional vacuum cleaner, not shown, and, if desired, the vacuum cleaner can be controlled by the switch 35 which controls the operation of the motor 32.

Operation and use of the beveling machine and therein the method of the invention can now be described. The edges of workpieces such as printed circuit boards are beveled by holding the edges to be beveled against the guide surfaces 51a – 52b and passing them in a direction parallel to the axis 34 of the cutting blade 31. The angle and depth of the cut are determined by the position of the axis 34 relative to the line of intersection between the guide surfaces.

The depth of the cut can be decreased and increased by adjusting the thumbscrews 28 to draw the top cover 22 and adjustable guide 52 toward the front and rear of the cabinet. The depth is increased as the guide is moved toward the rear, as indicated by the successive positions 61, 62 and 63 in FIG. 4.

The angle of the cut can be adjusted by the means of the thumbnuts 48, and the angle is indicated by the scale 49 on the threaded member 43. As the nuts are tightened, the threaded member and motor assembly are drawn upwardly, increasing the angle between the portion of the blade which does the cutting and the guide surfaces 51a and 51b. As the thumbnuts are loosened, gravity draws the motor assembly downward, and the angle between the blade and guide surfaces decreases. This relationship is illustrated in FIG. 4 where primed numerals are utilized to illustrate successively higher positions of the shaft 32a and the blade 31 and the resulting angles A between the blade and the guide surfaces 51a. The cuts produced on a workpiece 66 by these settings are illustrated in FIG. 5 and designated by the reference numeral B and primes thereof.

With a blade having a diameter of eight inches, the angle of the cut can be adjusted through a range on the order of 30° to 60° by moving the blade a distance on the order of 1½ inches. The scale 49 can be calibrated in degrees to provide a direct indication of the magnitude of the angle.

The invention has a number of important features. The circular cutting blade makes a smooth cut on printed circuit boards, without tearing the conductive foil or separating it from the substrate. The depth and angle of the cut can be independently and accurately adjusted, and the blade and motor are enclosed in a metal cabinet for safety. By making the length of the cut short relative to the diameter of the blade, the cut is substantially straight despite the curvature of the blade.

It is apparent from the foregoing that a new and improved beveling machine and method have been provided. While only the presently preferred embodiment has been described, as will be apparent to those familiar with the art, certain changes and modifications can be made without departing from the scope of the invention as defined by the following claims.

I claim:

1. In a machine for beveling the edge of a generally planar workpiece such as a printed circuit board, a generally rectangular enclosure having a stepped top with an offset portion extending along one edge below the remainder of the top, a fixed cover portion extending along the edge of the top opposite to said one edge, a movable cover member mounted between the offset portion and the fixed cover portion and cooperating with said portions to enclose the top of the enclosure, said movable cover member having a depending skirt portion disposed along the edge of the same adjacent to the offset portion, a circular cutting blade mounted for rotation about an axis within the enclosure, a portion of the blade extending through openings in the offset and skirt portions and being exposed externally of the enclosure, workpiece guide surfaces carried by the offset portion and the skirt portion, said guide surfaces intersecting along a line generally parallel to the axis of blade rotation and being adapted for slidably receiving a workpiece and guiding one edge of the same into the exposed portion of the blade in a direction generally parallel to the axis of rotation.

2. A beveling machine as defined in claim 1 further including means for adjusting the position of the cover member between the offset portion and the fixed cover portion to adjust the depth of a cut made by the blade relative to the guide surface carried by the cover.

3. A beveling machine as defined in claim 2 wherein the means for adjusting the position of the cover member includes a block rigidly affixed to the cover member and extending upwardly through an opening in the fixed cover portion, and a pair of adjusting screws threadedly mounted on the fixed cover portion and engaging opposing surfaces of the block, said adjusting screws being accessible externally of the enclosure.

4. A beveling machine as defined in claim 1 further including means for adjusting the position of the axis of rotation in a plane disposed obliquely of the guide surfaces to adjust the angle between the cutting edge of the exposed portion of the blade and the guide surface carried by the offset portion.

5. A beveling machine as defined in claim 4 wherein the blade is mounted on a shaft carried by a support member movable in a direction parallel to the obliquely disposed plane, and wherein the means for adjusting the position of the axis includes a threaded member connected to the support member and extending through a wall of the enclosure and an adjusting nut threadedly mounted on the threaded member and bearing against the outer surface of said wall.

6. A beveling machine as defined in claim 5 wherein the threaded member is provided with calibration markings indicative of the angle between the cutting edge and the guide surface.

* * * * *